US011144601B2

(12) United States Patent
Kavuri

(10) Patent No.: US 11,144,601 B2
(45) Date of Patent: Oct. 12, 2021

(54) MOBILE WEB SCRAPING

(71) Applicant: Yodlee, Inc., Redwood City, CA (US)

(72) Inventor: Sateesh Kavuri, Karnataka (IN)

(73) Assignee: Yodlee, Inc., San Mateo, CA (US)

(*) Notice: Subject to any disclaimer, the term of this patent is extended or adjusted under 35 U.S.C. 154(b) by 0 days.

(21) Appl. No.: 15/624,578

(22) Filed: Jun. 15, 2017

(65) Prior Publication Data

US 2018/0300408 A1 Oct. 18, 2018

(30) Foreign Application Priority Data

Apr. 17, 2017 (IN) .............................. 201741013546

(51) Int. Cl.
*H04L 29/08* (2006.01)
*G06F 16/951* (2019.01)
(Continued)

(52) U.S. Cl.
CPC ............ *G06F 16/951* (2019.01); *H04L 67/02* (2013.01); *H04L 67/12* (2013.01); *H04L 67/22* (2013.01);
(Continued)

(58) Field of Classification Search
CPC ......... H04L 67/02; H04L 67/12; H04L 67/22; H04L 67/2833; H04L 67/2842;
(Continued)

(56) References Cited

U.S. PATENT DOCUMENTS 10,607,300 B1 * 3/2020 Lesner .................. H04L 51/14
2001/0037294 A1 * 11/2001 Freishtat ............... G06Q 20/10
705/39

(Continued)

FOREIGN PATENT DOCUMENTS

WO WO2014164546 A1 10/2014

OTHER PUBLICATIONS

International Application No. PCT/US2018/027829, Notification of Transmittal of the International Search Report and the Written Opinion of the International Searching Authority, dated Oct. 31, 2018, 10 pages.

(Continued)

*Primary Examiner* — Jensen Hu
(74) *Attorney, Agent, or Firm* — Fish & Richardson P.C.

(57) ABSTRACT

Methods, systems and computer program products implementing data aggregation using distributed Web scraping are disclosed. A mobile device can scrape one or more target sites to collect data from accounts of a particular user. The scraping can occur under scraping conditions as specified by the user. The scraping conditions can include conditions based on time, power, bandwidth, usage, or any combination of the above. The scraping conditions can ensure that the scraping occurs at time that is most convenient to the user, e.g., when sufficient bandwidth is available to the mobile device or the mobile device is not performing other tasks. The mobile device can upload the scraped data to a data aggregation server under submission conditions as specified by the user. The data aggregation server can aggregate the scraped data, enrich the aggregated data, and provide the enriched data to the user through Web access.

13 Claims, 11 Drawing Sheets

(51) Int. Cl.
*G06Q 30/02* (2012.01)
*H04W 84/12* (2009.01)
*H04W 48/16* (2009.01)

(52) U.S. Cl.
CPC ...... *H04L 67/2833* (2013.01); *H04L 67/2842* (2013.01); *G06F 2216/03* (2013.01); *G06Q 30/0201* (2013.01); *H04W 48/16* (2013.01); *H04W 84/12* (2013.01)

(58) Field of Classification Search
CPC .............. G06F 16/951; G06F 2216/03; G06Q 30/0201; H04W 48/16; H04W 84/12
See application file for complete search history.

(56) References Cited

U.S. PATENT DOCUMENTS

| | | | | |
|---|---|---|---|---|
| 2002/0161913 | A1* | 10/2002 | Gonzalez | H04L 29/06 709/233 |
| 2003/0204460 | A1* | 10/2003 | Robinson | G06F 17/30914 705/35 |
| 2004/0117376 | A1* | 6/2004 | Lavin | G06F 16/9574 |
| 2004/0162773 | A1* | 8/2004 | Del Rey | G06Q 40/02 705/36 R |
| 2007/0250711 | A1* | 10/2007 | Storey | H04W 4/18 713/168 |
| 2007/0260673 | A1* | 11/2007 | Shenfield | G06F 17/30864 709/203 |
| 2008/0134035 | A1 | 6/2008 | Pennington et al. | |
| 2010/0083358 | A1* | 4/2010 | Govindarajan | G06F 21/33 726/6 |
| 2010/0151851 | A1* | 6/2010 | Bhatia | H04W 24/06 455/425 |
| 2011/0256889 | A1* | 10/2011 | Polis | H04L 67/02 455/456.3 |
| 2014/0047111 | A1* | 2/2014 | Petta | G06F 21/552 709/224 |
| 2014/0201319 | A1* | 7/2014 | Mannan | H04W 4/70 709/217 |
| 2016/0179838 | A1 | 6/2016 | Mavinakuli et al. | |
| 2017/0078259 | A1 | 3/2017 | Kumar et al. | |
| 2017/0193110 | A1* | 7/2017 | Crabtree | G06F 17/30864 |

OTHER PUBLICATIONS

PCT International Preliminary Report on Patentability in International Appln. No. PCT/US2018/027829, dated Oct. 31, 2019, 7 pages.

* cited by examiner

MOBILE WEB SCRAPING

TECHNICAL FIELD

This disclosure relates generally to transaction data processing.

BACKGROUND

User account data, or simply account data, can include data describing transactions between service providers and customers. The service providers can include, for example, Web publishers, hospitals, online merchants, or financial institutions. The customers can include, respectively for example, client computers, patients, shoppers, or bank customers. A data aggregation server can gather the account data and enrich the account data for data analyzers, e.g., research institutes for studying content download patterns, health trends, shopping trends, and bank service demand. Enriching the account data can include, for example, organizing the account data into categories, filtering the account data, correcting misspelled terms. The data mining server can obtain the account data by scraping sites of the service providers. Data scraping can include automatically logging into a site by a data mining server and extracting data from the site.

SUMMARY

Techniques of data aggregation using distributed data scraping are disclosed. A mobile device can scrape one or more target sites to collect data from accounts of a particular user. The scraping can occur under scraping conditions as specified by the user. The scraping conditions can include conditions based on time, power, bandwidth, usage, or any combination of the above. The scraping conditions can ensure that the scraping occurs at time that is most convenient to the user, e.g., when sufficient bandwidth is available to the mobile device or the mobile device is not performing other tasks. The mobile device can upload the scraped data to a data aggregation server under submission conditions as specified by the user. The data aggregation server can aggregate the scraped data, enrich the aggregated data, and provide the enriched data to the user through Web access.

The features described in this specification can be implemented to achieve one or more advantages over conventional data scraping techniques. For example, the disclosed techniques are more flexible than conventional data scraping where the data gathering is performed at a data mining server. Distributed data scraping does not require the server to store user credentials for accessing target sites, thereby enhancing security. Some target sites may have enhanced security features that prevent server login and only permits login from registered mobile devices. These security features can defeat conventional data scraping techniques where scraping is originated from a server. The disclosed techniques allow data scraping from the register mobile devices, and are suitable to be implemented under such enhanced security features of the target sites.

Compared to conventional techniques, the disclosed techniques are more convenient to the user. The data that the user requests can be downloaded to a mobile device of a user directly, instead of or in addition to through a server. The direct download time can be scheduled by the user according to the user's needs, and is not constrained by scraping schedules of the server.

The disclosed techniques are more fault tolerant. By bypassing the server, the direct download reduces latency and avoids interruptions caused by server down time. Using mobile devices, e.g., users' smartphones as data gatherers, a server's needs for bandwidth and processing power can be reduced. The reduced needs can reduce maintenance cost of a data analyzer for operating the server.

The details of one or more implementations of the disclosed subject matter are set forth in the accompanying drawings and the description below. Other features, aspects and advantages of the disclosed subject matter will become apparent from the description, the drawings and the claims.

BRIEF DESCRIPTION OF THE DRAWINGS

Like reference symbols in the various drawings indicate like elements.

DETAILED DESCRIPTION

Figure 1:
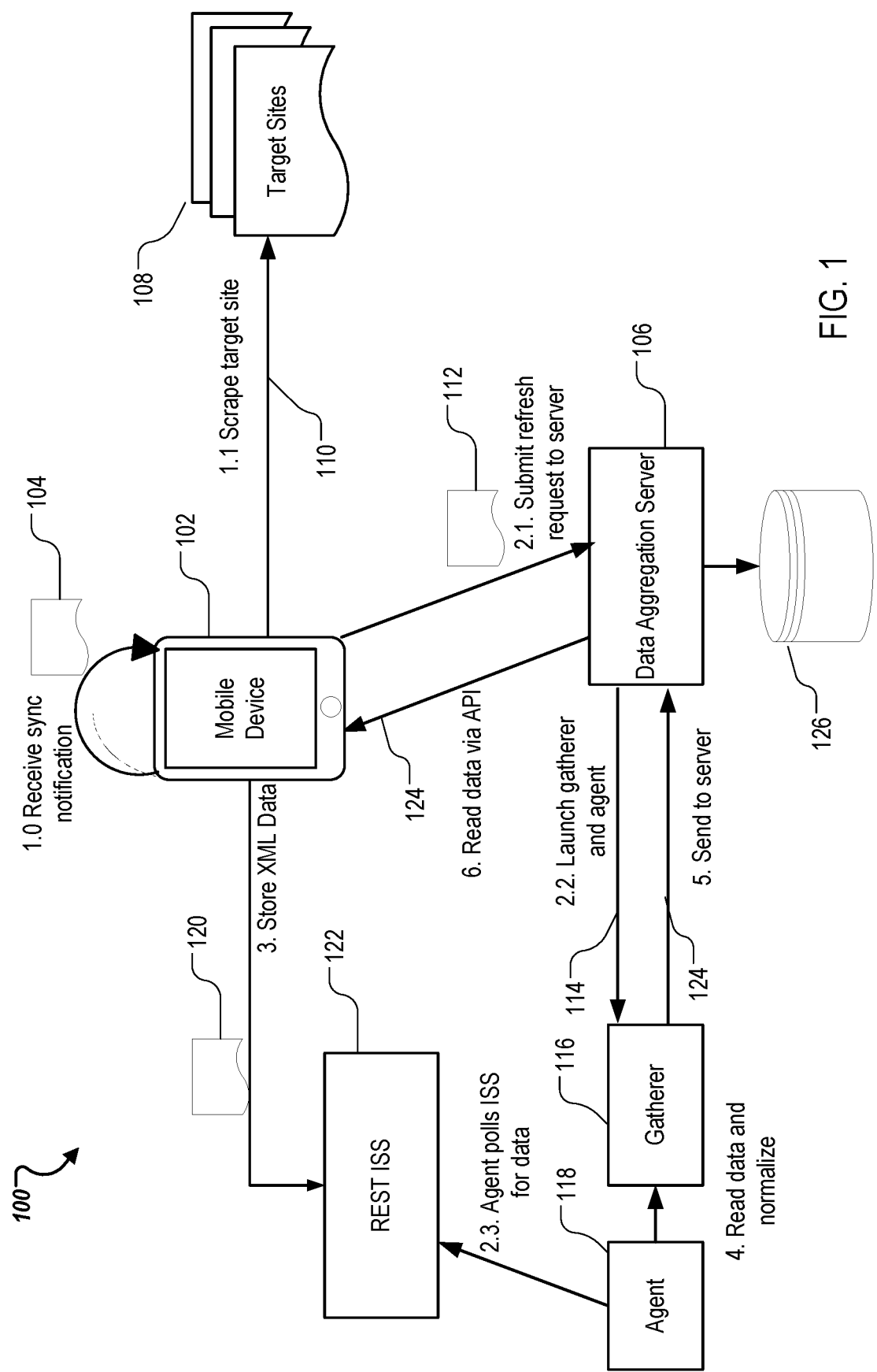
FIG. 1 is a block diagram illustrating an example information extraction system.

FIG. 1 is a block diagram illustrating an example information extraction system 100. The information extraction system 100 includes a mobile device 102 that includes one or more processors programmed to perform data collection operations. The mobile device 102 is configured to gather account data through site scraping. The mobile device 102 can be a smartphone, a tablet computer, a laptop computer, a wearable device or various devices that have wired or wireless communication features and are operated by a user.

The mobile device 102 can receive a synchronization notification 104 from a program executing on the mobile device 102 or from a data aggregation server 106. The data aggregation server 106 can include one or more computers of a data enrichment and analysis platform, e.g., a Yodlee® data platform. The synchronization notification 104 can be a message, or an event, that indicates that the mobile device 102 shall collect account data from one or more target sites 108.

An application executing on the mobile device 102 can submit the synchronization notification 104 automatically, under certain system-specified or user-specified schedules. For example, the application can be configured to submit the synchronization notification 104 on a system-specified or user-specified schedule, e.g., at hour X every day, Y minutes after all activities including motions and uses cease at the mobile device 102, immediately after each financial transaction, among various other schedules. The application can submit the synchronization notification 104 according to the schedule upon determining that, at time scheduled to collect the account data, certain system-specified or user-specified conditions are satisfied, for example, when Wi-Fi™ connections are available, when battery level is above a threshold, etc.

The synchronization notification 104 can include instructions for scraping various account data. The account data can include data describing transactions and, more generally, data describing status of one or more accounts of a user. For example, account data on a user's health care account can include transactional information about, for example, a time the user received a particular prescription, a name of the prescription, a quantity of the prescription, a cost of the prescription, and additionally or alternatively, status data, e.g., a history of past prescriptions. Likewise, account data on a user's financial account can include transaction records of a user's deposits, withdrawals, purchases, and additionally or alternatively, status data including current balances, monthly minimum and maximum balances, etc.

In some implementations, the mobile device 102 can receive the synchronization notification 104 from the data aggregation server 106. The data aggregation server 106 can include one or more computers programed to generate a report using data from the target sites 108. The report can be an aggregated report, e.g., a monthly status report, of transaction data from multiple target sites 108. For example, the report can include an aggregated prescription report from multiple physicians, e.g., a family doctor, a gastronomist and a cardiologist of a same patient, or an aggregated financial statement from bank account, an investment account and a credit card account of a customer. The patient or the customer can specify content of the report through a user interface provided by the data aggregation server 106. The report can include enriched data. For example, the report can aggregate a payment card account and a bank account configured to automatically pay the balance of the payment card account. The data aggregation server 106 can aggregate the bank account data and the credit account data and predict a bank account balance on a future date.

To generate the report, the data aggregation server 106 collects data from various sources. Collecting the data includes scraping account data from the target sites 108. The data aggregation server 106 can delegate the data scraping tasks to the mobile device 102. The delegation can allow the data aggregation server 106 to distribute data collection jobs for multiple users to multiple mobile devices instead of performing the scraping tasks on the data aggregation server 106. The delegation de-centralizes data collection to multiple user devices including the mobile device 102.

The target sites 108 can include Web sites or other types of data download sites, e.g., FTP (file transfer protocol) sites or mail servers. The target sites 108 correspond to one or more service providers. The service providers can include health care providers, schools, financial institutes, among others. The target sites 108 may implement various security features, e.g., measures that prevent devices other than a device from which a user registered with the target sites 108. These security features can prevent the data aggregation server 106 to access the target sites 108 directly. The decentralized data collection can allow the data aggregation server 106 to collect data through registered devices, e.g., the mobile device 102. Accordingly, the data aggregation server 106 can generate the requested report without resorting to requesting the target sites 108 to open security backdoors for the data aggregation server 106.

Collecting 110 account data from the target sites 108 can include logging into each of the target sites 108 using user credentials stored on the mobile device 102. The mobile device 102 can then navigate the pages of target sites 108, parse the pages, and retrieve the account data using various scraping techniques.

Upon receiving the scraped data, the mobile device 102 can perform various updating operations. The updating operations can include submitting a refresh request 112 to the data aggregation server 106. The refresh request 112 notifies the data aggregation server 106 that scraped data is available to the data aggregation server 106. The data aggregation server 106, in response, can perform actions to retrieve the data collected by the mobile device 102. For example, the data aggregation server 106 can launch (114) a gatherer 116 and an agent 118 for collecting the scraped data. The gatherer 116 can include an agent manager process that spawns one or more agents 118. Each agent 118 can correspond to a respective target site 108. Different target sites 108 can correspond to different agents 118. The gatherer 116 and an agent 118 are computer programs configured to execute by one or more processors and cause the one or more processors to gather collected account data from the mobile device 102.

The updating operations performed by the mobile device 102 can include preparing the scraped account data for the data aggregation server 106. Preparing the scraped data can include wrapping the scraped data in a standard format, e.g., the XML (extensible markup language) format for storage and for transmission. In some implementations, the mobile device 102 can provide formatted data 120 to an intermediate storage server (ISS) 122 for temporary or permanent storage. The ISS 122 is an optional component of the information extraction system 100 including one or more non-transitory storage devices. In some implementations, the ISS 122 can be implemented using representational state transfer (REST) Web services.

The agent 118, after being launched, can retrieve the formatted data 120 from the mobile device 102 or from the ISS 122. The agent 118 can normalize the retrieved data, and provide the normalized data to the gatherer 116. The gatherer 116 can provide (124) the data gathered from one or more agents 118 to the data aggregation server 106.

In some implementations, the data aggregation server 106 and the mobile device 102 can communicate through a communication channel 124. The mobile device 102 can read various data, including scraping instructions, categorized data and aggregated reports, from the data aggregation server 106 through the communication channel 124.

The data aggregation server 106 can include, or be coupled with, a data store 126. The data store 126 can include a non-transitory computer-readable medium storing aggregated data, e.g., data scraped by mobile device 102 over a period of time and other relevant data, e.g., metadata and data scraped by the data aggregation server 106. The data store 126 can store particular user credentials for accessing the target sites 108. The data aggregation server 106 can use the stored user credentials to scrape account data from those target sites 108 that are not scraped by the mobile device 102 but are requested by the user nonetheless. The mobile device 102 can read the aggregated data, and reports generated from the aggregated data, using the interactive API through the communication channel 124. The mobile device 102 can present the aggregated data on a display surface of the mobile device 102, or store the aggregated data for later use. In various implementations, a client device other than the mobile device 102, e.g., a desktop computer, can access and store or present the aggregated data and the reports.

Figure 2:
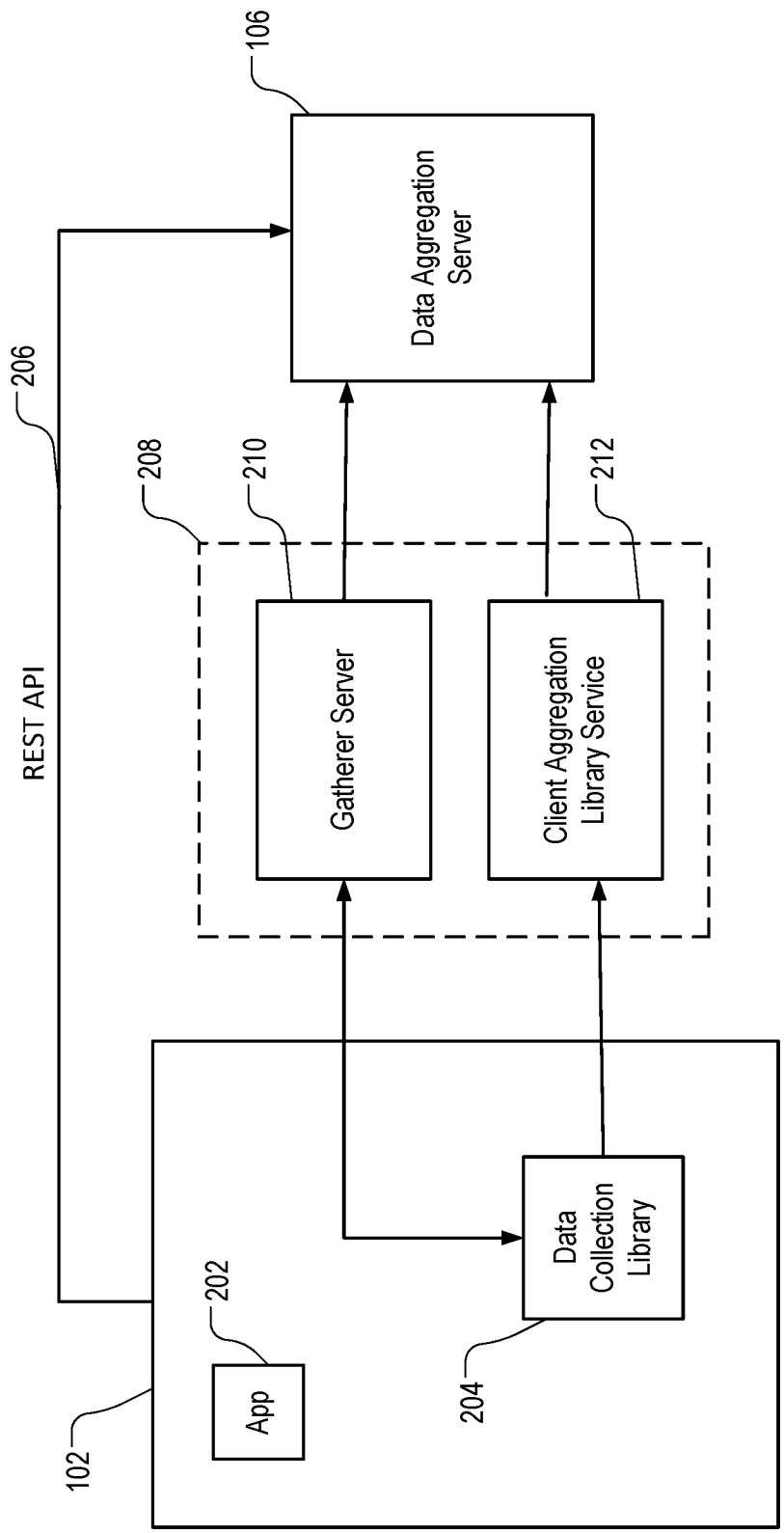
FIG. 2 is a block diagram illustrating example communication channels from a mobile device and a data aggregation server.

FIG. 2 is a block diagram illustrating example communication channels from a mobile device 102 and a data aggregation server 106. The mobile device 102 includes one or more processors configured to execute one or more application programs. For convenience, an account management application is described. Various applications, e.g., healthcare record management applications, inventory management applications, or chain store business management applications, can be implemented similarly. A scraping mobile application 202 that is configured to collect account data by scraping various target sites, e.g., Web sites of service providers and provide account management functions, e.g., fund transfer, payment scheduling, direct deposit setup, statement summary, among others.

The mobile device 102 installs a data collection library 204 that is used by the application 202. The data collection library 204 includes computer instructions for configuring synchronization settings and service provider settings. The data collection library 204 can be a native library, e.g., an Android and iOS library, given the native device dependencies. The data collection library 204 provides a settings interface for a scraping scheduler. The scraping scheduler is configured to receive, through the settings interface, user input for synchronization settings including, for example, time preference for scraping the data, scraping data over Wi-Fi connection, mobile data connection, or both. The data collection library 204 can store a local protected copy of user credentials for accessing one or more target sites, e.g., Web sites of service providers. In some implementations, the data collection library 204 can include computer instructions that, when executed, cause the mobile device 102 to store credentials for accessing an external data gathering service that is configured to scrape data from the target sites. The external data gathering service can be a cloud-based service that a user already setup for collecting data.

The data collection library 204 implements functions that interact with a data aggregation server 106 via an API 206. In some implementations, the API 206 can be a centralized REST API. The data collection library 204 implements a site scraping agent, e.g., the agent 118 of FIG. 1. The library 204 can include functions for implementing a gatherer, e.g., the gatherer 116 of FIG. 1, that is based on the centralized REST API. The mobile device 102 can store the scraped data to the gatherer.

In some implementations, various functions implemented by the data collection library 204 can cause the mobile device 102 to communicate with the data aggregation server 106 through one or more intermediary services 208, e.g., to read data that has been processed by the data aggregation server 106. The intermediary services 208 include components configured to process transactions between the mobile device 102 and the data aggregation server 106 and process scraped account data. The intermediary services 208 can include an ISS. The mobile device 102 can store the scraped data in the ISS. A corresponding client agent can poll and read the data from the ISS. Each client agent corresponds to a respective service provider.

The intermediary services 208 can include a gatherer server 210. In some implementations, the gatherer server 210 can include the ISS. The gatherer server 210 can include one or more computers configured to provide site scraping scripts to the mobile device 102, or receive site scraping scripts from the mobile device 102. The gatherer server 210 can receive and store scraped data, e.g., one or more page dumps, from the mobile device 102.

The mobile device 102 launches the application 202 according to the synchronization settings, e.g., a schedule specified by a user that specifies that the application 202 shall be launched, for example, every 24 hours, and, in particular, after wakeup or before sleep for all service provider sites. Each of the wakeup and sleep corresponds to a state of the mobile device 102 where the mobile device 102 has recognized a particular usage pattern indicating that a user of the mobile device 102 is likely to start or stop using the mobile device 102. The mobile device 102 can open a communication session, e.g., a WebView session, in which navigation and scraping are performed. The communication session can be an automatic and background session without having to use a user interface such as a browser. The mobile device 102 navigates to the respective target sites and relevant pages as specified for each target site and collect the data from the pages. The pages can include, for example, home pages, monthly summary pages, and statement pages.

The mobile device 102 can scrape data from the pages, e.g., by taking a page dump or by parsing various sections of the pages to retrieve specific data fields. The mobile device 102 submits the scraped data to the gatherer server 210 for processing. The mobile device 102 can perform the scraping and submission operations in rapid succession from one site to another. The gatherer server 210 can include various tools, for example, a Web automation and testing tool (e.g., Sahi), that are configured to process the scraped data. The gatherer server 210 can provide the processed data to the data aggregation server 106.

The mobile device 102 can implement various features that allow the scraping to be fast and not to affect execution and usability of other applications of the mobile device 102. The scraping can be configured to incur minimal usage of resources of the mobile device 102, e.g., battery power. The scraping minimizes the overall battery usage in various ways. For example, the scraping can be programmed to occur only when external power is available, e.g., when the mobile device 102 is plugged into a charging port or docked. Scraping can be configured to execute only when the battery level is above a threshold, e.g., above X percent. The scraping can be configured to incur minimal usage of CPU, memory, and network usage. For example, the mobile device 102 can be configured to minimize network usage as much as possible by using compression wherever necessary. Network synchronization can be maintained in such a way that there is no "denial of service" errors, from the service provider's servers, e.g., the target sites 108 of FIG. 1, or from data aggregator's servers, e.g., the data aggregation server 106.

The intermediary services 208 can include a client aggregation library service 212. The client aggregation library service 212 can include a shim library configured to interact with the application 202 to provide functions including, for example, user behavior analysis, user settings management, among others. The client aggregation library service 212 can interact with the data aggregation server 106, including obtaining various aggregation requests. The mobile device 102 keeps track of user behavior, usage and operating environment of the mobile device 102. The user behavior, usage and operation environment can include, for example, network availability, e.g., whether Wi-Fi connection or mobile connection is available; whether the mobile device 102 is docked; screen on/off period; phone charging patterns (time of the day), among others. The mobile device 102 can submit the tracked information to the client aggregation library service 212 for analysis. The client aggregation library service 212 can determine, based on the tracked information, a pattern that corresponds to a wakeup state and a pattern that corresponds to a sleep state. The wakeup state and sleep state may be different on different mobile devices, and can be particular to each user of a corresponding mobile device.

The mobile client library 204 tries to minimize cache refresh failures. In client side aggregation, there is a chance of cache refresh failures when the user does not wish the aggregation to happen. The data collection library 204 is designed to minimize failed cache refreshes. The data collection library 204 adopts multiple strategies to minimize the failures. For example, the data collection library 204 can implement multiple operating modes to handle refreshes. The operating modes include, for example, a user specified timing mode, an automated timing mode, and a mixed mode.

In the user specified timing mode, the mobile device 102, or the client aggregation library service 212, determines a user pattern of synchronizing with the data aggregation server 106 at one or more time slots. The one or more time slots can include pre-defined time slots that a user sets, e.g., between 1 am and 2 am. The user-set time slots can be specified in a database or a configuration file. Additionally, settings for the time slots can be associated with activities, or a combination of activities and time windows. Settings associated with activities can specify, for example, data collection shall occur after wakeup or before sleep. These example settings can indicate that scraping is preferably performed at the beginning of the day or end of the day for the user. The user specified timing mode has the benefit of predictable data collection. This operating mode also establishes a user behavior pattern towards the data aggregation server 106. This operating mode is comparable to anyone checking email/messaging as and when the person wakes up.

The mobile device 102 may prevent the scraping from happening at the specified time when a high priority activity on the mobile device 102, e.g., a phone call, is ongoing. This feature would be more effective in terms of usability if, for example, a personal financial manager program is configured to perform a real-time update of the user's data after scraping. The real-time update can encourage a user to select the user specified timing mode.

In the automated timing mode, the mobile device 102 automatically determines specific periods when scraping can happen for the target sites without requiring user input. For example, the mobile device 102 can determine that data collection shall occur when the mobile device 102 is docked for charging and when a screen of the mobile device is on, or when a user just finished a phone call, the screen is on and no further user interaction with the mobile device 102 is detected. In the automated timing mode, the application 202 using the library 204 can keep track of various device activities that may indicate user behavior. The device activities can include, for example, frequency of screen on and off, network availability, charging pattern, among others.

While the mobile device 102 submits collected data to the data aggregation server 106, the mobile device 102 gives out an indication that synchronization is happening. The indication can include a notification. The mobile device 102 can keep the screen of mobile device 102 unchanged during the synchronization. Accordingly, the synchronization can be automated without user intervention, at least for some devices, e.g., Android™ smartphones. The automated timing mode can potentially minimize cache refresh failures.

The automated timing mode is based on understanding of usage behavior of the mobile device 102. In the automated timing mode, the mobile device 102 may launch the application 202 at irregular intervals. To avoid interfering the user's activities, the mobile device 102 may interrupt the data scraping in response to a user input, e.g., a setting that specifies that the application 202 shall not be launched when certain activities are ongoing. In some implementations, e.g., on iOS™ smartphones, a user can initiate the synchronization.

In the mixed mode, the mobile device 102 uses a combination of user specified timing and automated timing to improve the overall success rate of cache refreshes. In the mixed mode, the mobile device 102 attempts to collect account data from target sites according to user specified timing. If the scraping of the target sites was not successful, e.g., was not completely finished during user specified timing periods, the mobile device 102 can re-attempt the collection according to automated timing logic. For example, the mobile device 102 can enable scraping at pre-defined time and scrapes whenever possible. In some implementations, the mobile device 102 can enable scraping in response to user input.

The mobile device 102 can determine a total number of target sites to be scraped, and whether the total number exceeds a threshold. Upon determining that the total number exceeds the threshold, the mobile device 102 determines if scraping these target sites will take more than a pre-specified time. In response to determining that the scraping will take more than the specified time, the mobile device 102 keeps track of the user behavior to understand when to collect the data to avoid time periods during which the user may be using the mobile device 102. Operating in the mixed mode may have an overall improvement of success rate in cache refreshes.

To use the automated timing mode and the mixed mode, the mobile device 102 or the client aggregation library service 212 can analyze user activity patterns, e.g., a user's phone usage frequency, time and duration. In some implementations, the client aggregation library service 212 can collect usage information submitted by the mobile device 102 and perform the analysis. For example, the mobile device 102 can provide a call log to the client aggregation library service 212. The client aggregation library service 212 can determine time periods that the user never made or received a phone call, and provide the time periods to the mobile device 102.

The data collection library 204 may call various features of the mobile device 102. These features can include applications installed on the mobile device 102, for example, WebView, automated page navigation software, and page download software. The data collection library 204 can use compression wherever necessary or possible. The features of the mobile device 102 called by the data collection library 204 can include system functions, e.g., push notifications, alarm notifications for time based scraping, secure password locker, local preference cache, battery, display, memory and CPU tracker, and APIs for detecting battery low notifications, display on and off detection, and application usage.

The mobile device 102 can take various approaches to scrape data. In some implementations, the mobile device 102 can put all transaction applications, e.g., banking and credit card management applications in an emulator pod, e.g., an Android emulator pod. The mobile device 102 can scan the communication between mobile device 102 and a target site of a service provider, and dump data related to the transaction to a storage device. The mobile device 102 aggregates the dumped data later, for example, at a time of low CPU usage and no network communication. This backup scheme can be implemented in case service providers do not use security features that link service providers' applications to a phone and SIM card combination.

In some implementations, the mobile device 102 can use mobile application to mobile application communication to implement various scraping techniques. The application-to-application communication can enable a scraping mobile application 202 to communicate with an external mobile application instead of performing the scraping directly. The external application can perform the data collection, and provide collected data to the scraping mobile application 202. The scraping mobile application 202 can scan the data and retain the streams of the communication. The application-to-application communication approach can be implemented in cases where various operating systems, e.g., Android and iOS, allow application-to-application communication. To enable application-to-application communication, the mobile device 102 can be rooted, an operation that some user may have access to. The communication can be retained through TCP layer access. In order to make changes to the TCP layer, one can modify the core OS TCP stack. Modifying the TCP stack may the mobile device 102 to be rooted.

In some implementations, the mobile device 102 is configured to log into a service provider's website daily to pull data in the form of email attachments. This approach utilizes various business-to-consumer (B2C) features provided by a service provider, for example, by using consumer-oriented features of the service provider.

Figure 3:
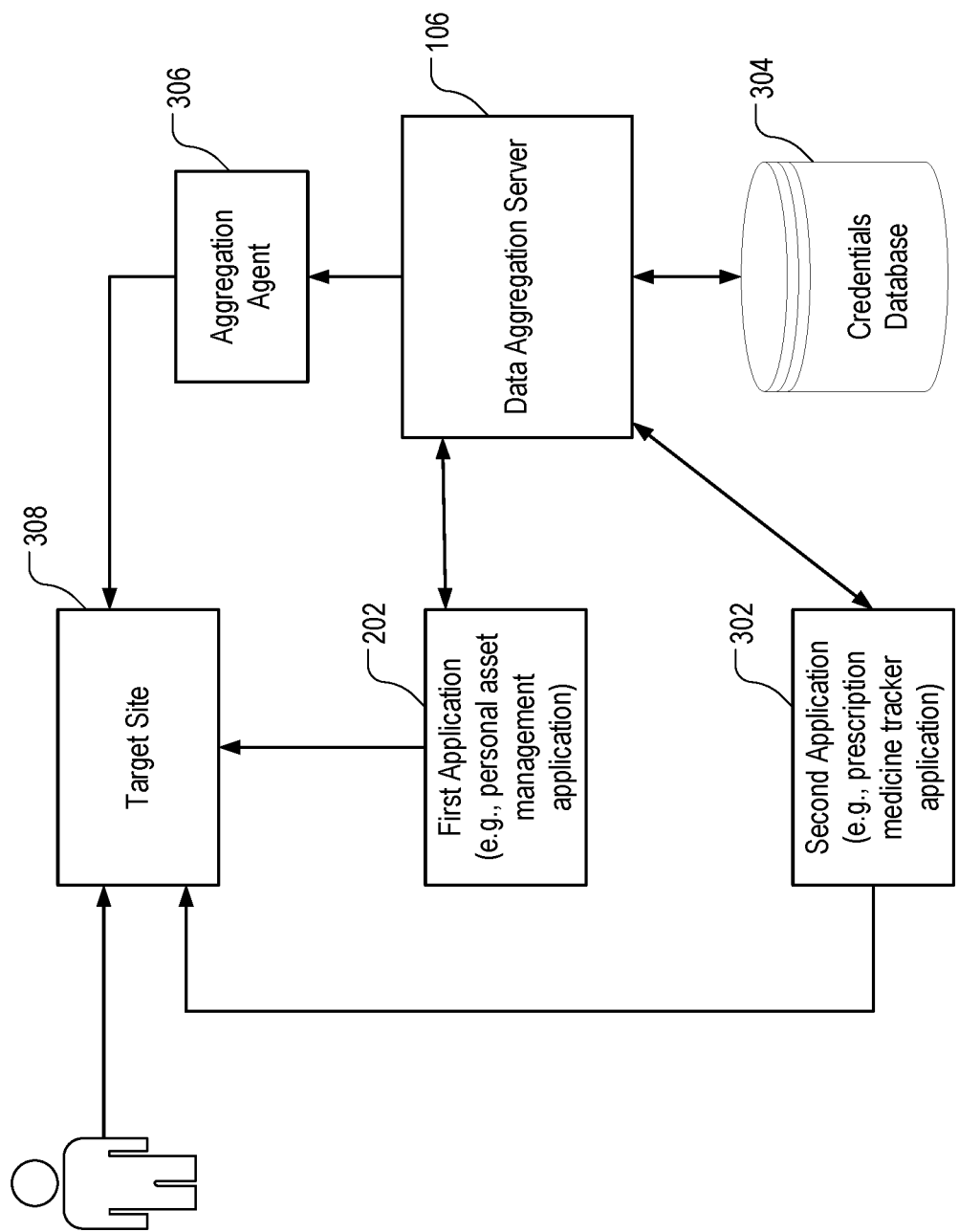
FIG. 3 is a block diagram illustrating an example flow in distributed data scraping.

FIG. 3 is a block diagram illustrating an example flow in distributed data scraping. A data aggregation server 106 includes one or more computer processors is configured to receive requests from various applications 202 and 302 to aggregate various account data, and provide the aggregated data to the applications 202 and 302. Each of the applications 202 and 302 can be an application configured to process and present aggregated data. For example, applications 202 and 302 can include census applications or personal asset management applications, e.g., Yodlee® Personal Financial Management (PFM) applications.

The data aggregation server 106 can include, or be coupled to, a credentials database 304. The credentials database 304 can store user credentials for accessing one or more target sites of one or more respective service providers. The data aggregation server 106 can communicate with one or more aggregation agents 306. The data aggregation server 106 can inform each aggregation agent 306 of synchronization time and provide various tasks coordinating operations of aggregation agents 306. Each aggregation agent 306 can communicate with one or more target sites 308. A target site 308 can be a Web site, FTP site, or other site of a service provider customized for mobile devices. An aggregation agent 306 can request the target site 308 to send one or more data items to a user or to the data aggregation server 106, e.g., as one or more email attachments. The applications 202 and 302 can communicate with the one or more target sites 308 to collect data from the one or more target sites 308. The data aggregation server 106 and the target site 308 can communicate with a messaging system, e.g., an email server or an FTP server, to facilitate the submission of the data items.

Figure 4:
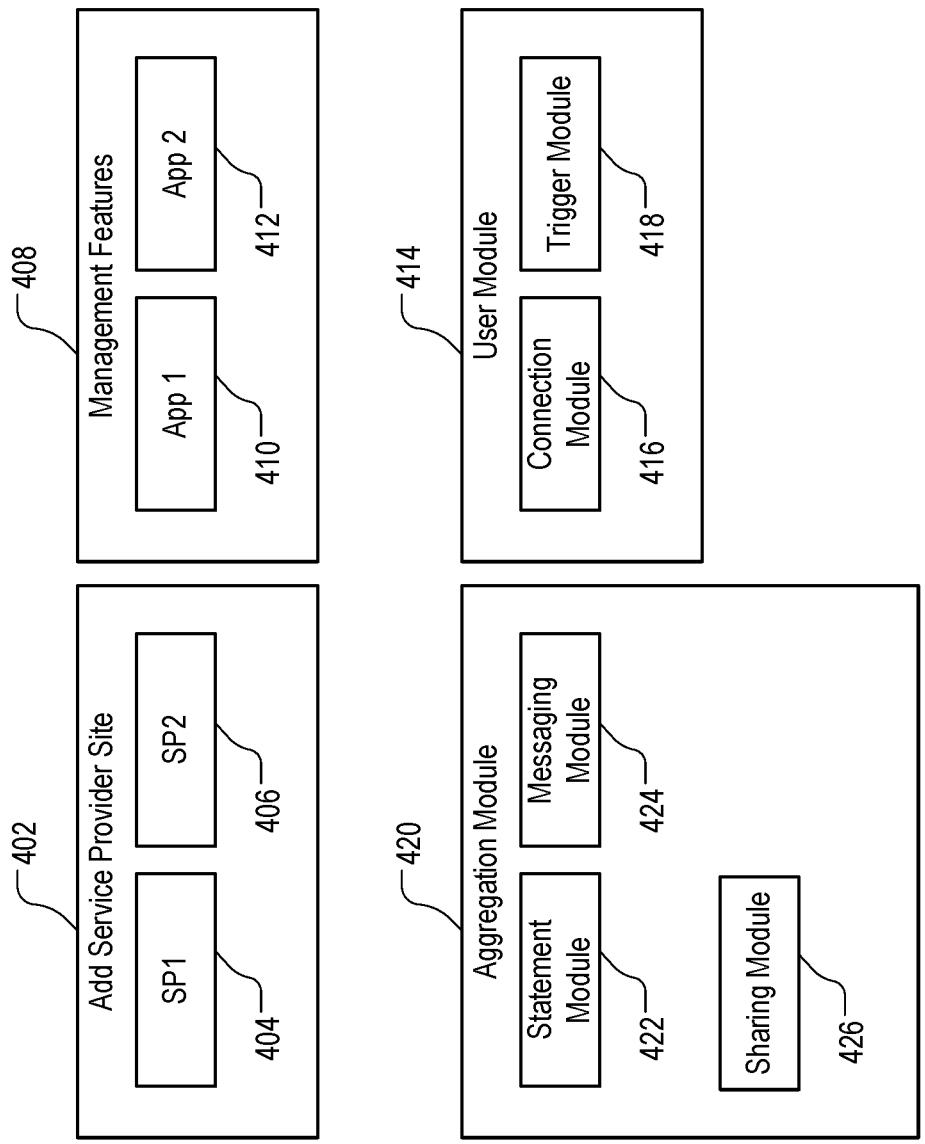
FIG. 4 is a block diagram illustrating functional blocks of an example information extraction system.

FIG. 4 is a block diagram illustrating functional blocks of an example information extraction system. Each functional block, and each module of the functional block as described below, can be implemented by hardware, hardware and software, or hardware and firmware components of a mobile device or a data aggregation server, e.g., the mobile device 102 of FIG. 1, the data aggregation server 106 of FIG. 1, or both.

The mobile device or data aggregation server can implement a site management functional block 402. The site management functional block 402 is configured to add, manage, and delete one or more target sites, e.g., target sites 404 and 406, of service providers for scraping. The site management functional block 402 can store references to the added sites, e.g., links, in a target site data store, as well as user credentials of the added sites.

The mobile device or data aggregation server can implement a management features functional block 408. The management features functional block 408 is configured to add, manage, and delete various applications that consume the aggregated data. The applications can include, for example, a personal asset management service 410, a small business lending service 412, or a business or personal loan service. These services can manipulate the aggregated data and present results of various analysis of the aggregated data as one or more reports for display on user devices.

The mobile device or data aggregation server can implement a user module 414. The user module 414 is a component configured to receive user input to perform various operations. The user module 414 includes a connection module 416. The connection module 416 is a component configured to create a logical connection between an application, e.g., a personal asset management service, and a service provider. For example, the connection module 416 can receive a user input to add a particular bank account to the personal asset management service, and create a logical connection between the bank account and the personal asset management service. The user module 414 can include a trigger module 418. The trigger module 418 can accept a user input to specify that an action is performed in response to an event. For example, the trigger module 418 can create a trigger in response to a user input. The trigger can specify that, in response to an email message received by a user's mailbox from a particular service provider, an attachment of the email is forwarded to a data aggregation server.

The mobile device or data aggregation server can implement an aggregation module 420. The aggregation module 420 is a component configured to perform various data gathering operations. The aggregation module 420 includes a statement module 422. The statement module 422 is a component configured to collect account statements from service providers. For example, directly or through an agent, a mobile device or a data aggregation server can use the statement module 422 to login to a target site and navigate to a "generate account statement" page. The "generate account statement" page can be a page configured to generate an account statement, e.g., a bank statement or credit card statement, for a specified period of time. The statement module 422 can enter a "from" date and a "to" date to define the period of time. The statement module 422 can scrape the generated account statement.

The aggregation module 420 includes a messaging module 424. The messaging module 424 is a component configured to present the statement to a user through messaging. For example, the messaging module 424 can email a statement obtained by the statement module 422 to a user's email inbox.

The aggregation module 420 includes a sharing module 426. The sharing module 426 is a component configured to share the statement with the applications, e.g., the personal asset management service 410, the small business lending service 412, or a business or personal loan service provided. The sharing can include retrieving the statements provided by the messaging module 424 and received by the data aggregation server, and submitting a representation of the statement through a previously created connection.

Figure 5:
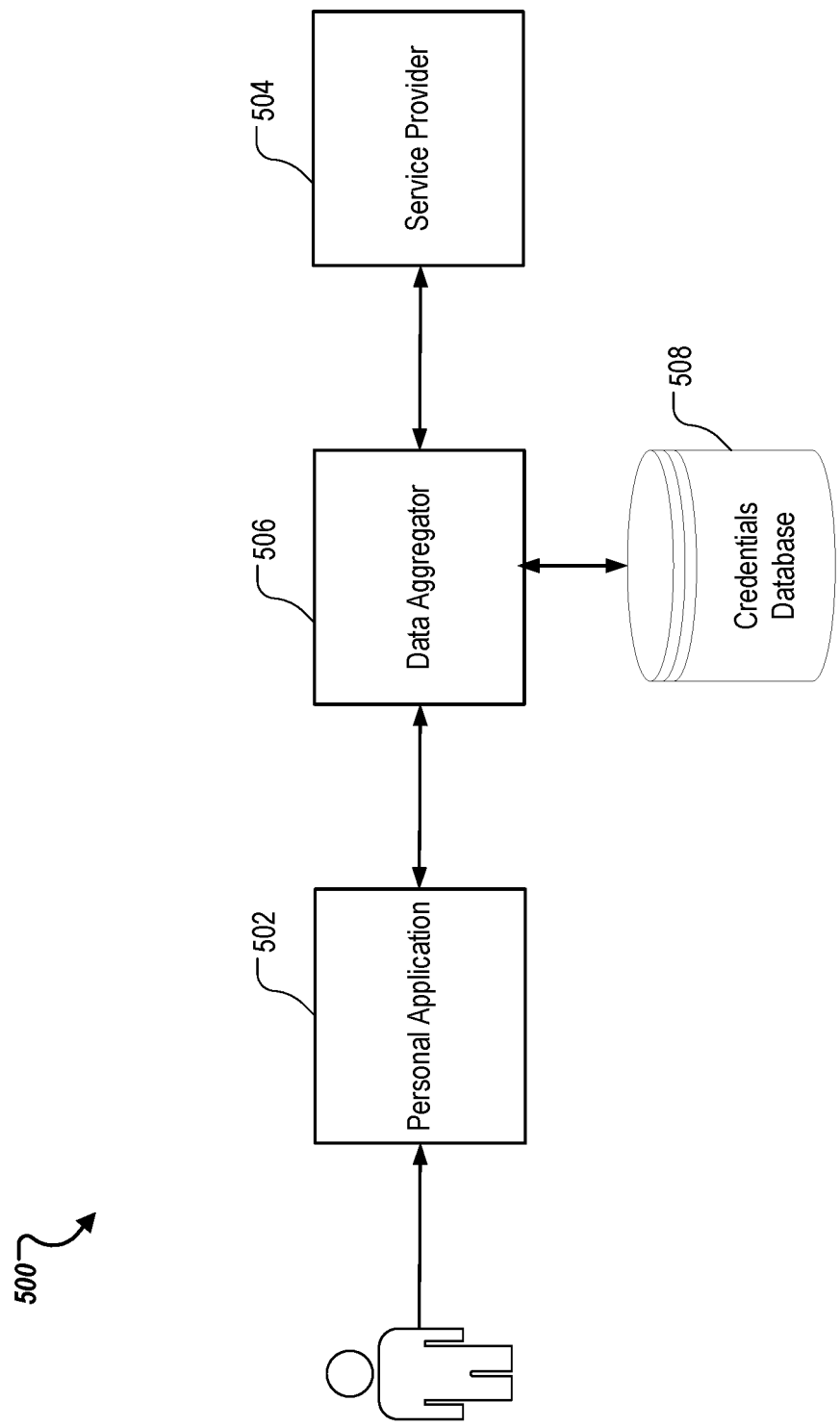
FIG. 5 is a block diagram of a conventional information extraction system for reference.

FIG. 5 is a block diagram of a conventional information extraction system 500 for reference. In a conventional system 500, a user can access the user's aggregated information through a personal application 502. The personal application 502 can execute on a mobile device. The personal application 502, instead of communicating with one or more target sites 504 directly, communicates with a data aggregator 506. The data aggregator 506 is coupled to a credentials database 508. The credentials database 508 stores login credentials of the user. The data aggregator 506 logs into the target sites 504, which are sites of service providers. The data aggregator 506 scrapes the data, processes the scraped data, and provides the processed data to the personal application 502 for consumption, e.g., for presentation to the user.

Multiple user may request aggregated data. In the conventional system 500, data scraping is centralized at the data aggregator 506. The data aggregator 506 maintains login information for all users. The scraping may not be always feasible, because the target sites 504 may implement security measures preventing the data aggregator 506 from login.

Figure 6A:
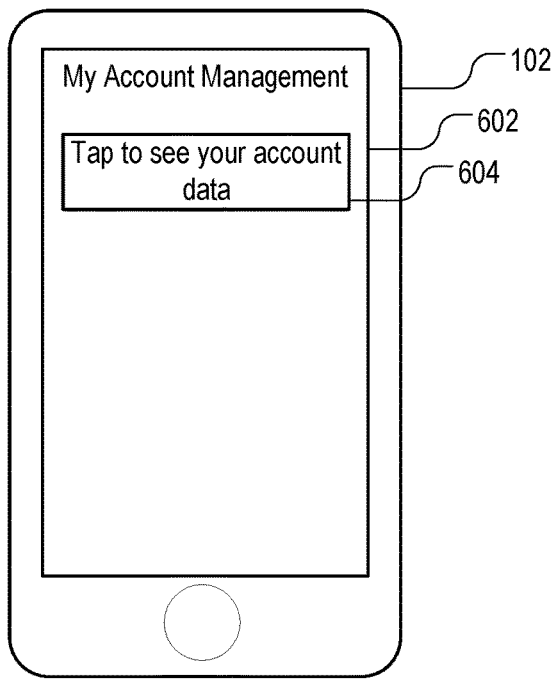
FIGS. 6A-6D illustrate example user interfaces of an information extraction system.
Figure 6B:
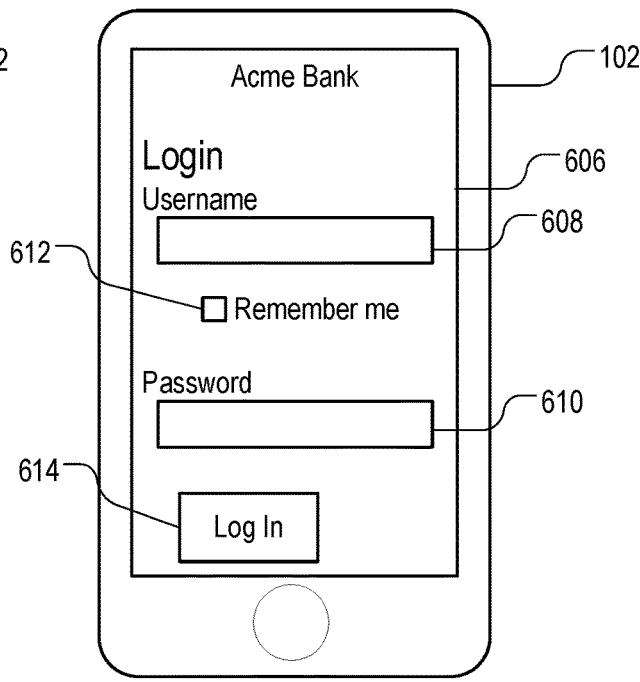

FIGS. 6A-6B illustrate example user interfaces of an information extraction system. The user interfaces can be presented on a mobile device, e.g., the mobile device 102 of FIG. 1.

FIG. 6A illustrates an example start page 602. The mobile device can launch an application, e.g., an account management application. The application causes a start page 602 to be displayed on a display surface, e.g., a touch screen, of the mobile device. The start page 602 can include a virtual button 604. The virtual button 604 is a user interface item that, upon receiving a touch input, cause the application to move to a next page.

FIG. 6B illustrates an example account page 606. The mobile device can display the account page 606 in response to a user input on the virtual button 604. The account page 606 can correspond to a particular service provider, e.g., "Acme Investments," that has been previously registered with the application, e.g., through the site management functional block 402 of FIG. 4. For a first time access, the account page 606 can display a login screen, including username field 608 for receiving a username, a password field 610 for receiving a password, a remember credential field 612 that, if checked, causes the application to store credentials for logging into the account, and a login virtual button 614 for logging into the account. In some implementations, the application remembers the credentials entered in the username field 608 and password field 610. The application can log into the account periodically, in the user specified time mode, automatic time mode, or mixed time mode as discussed above. The application can then collect data from the service provider's site and store the collected data on the mobile device.

Figure 6C:
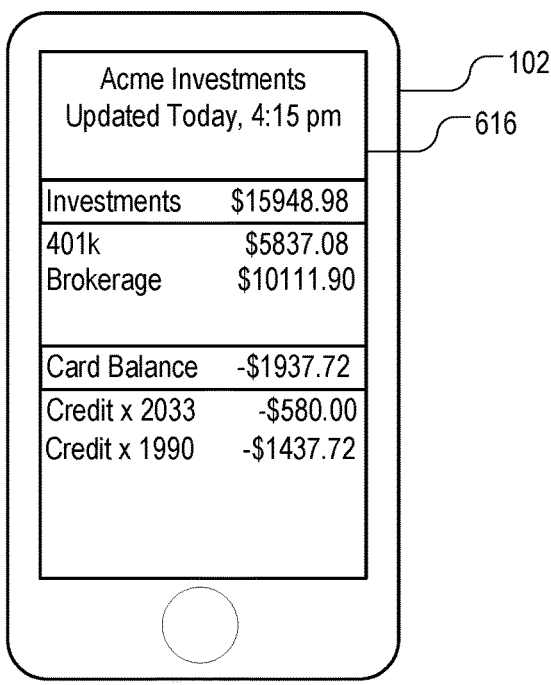

FIG. 6C illustrates an example summary page 616. Upon logging into an account, the application can retrieve various information related to the account. The information can include aggregated information, e.g., information from investment accounts and credit card accounts. The application can retrieve the information real time or, in some implementations, scrape the information from the service providers site, store the information on the mobile device or on a data aggregation server, and retrieve the information from the storage.

Figure 6D:
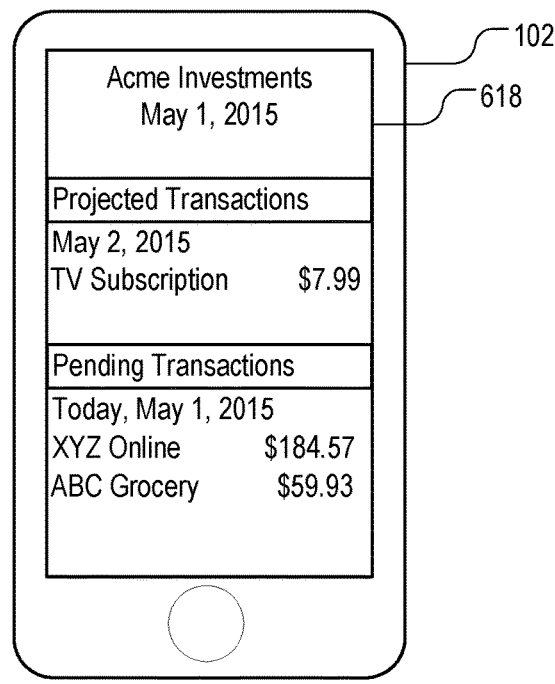

FIG. 6D illustrates an example projection page 618. In the projection page 618, the application can display data aggregated from various accounts registered with the application and enriched data that indicates projected balance in the future. The application can register, through the site management functional block 402 of FIG. 4, one or more streaming content subscription accounts, one or more credit card accounts and various purchase accounts in addition to the service provide ("Acme Investments") account. Analyzing history of scraped data, the application can determine that a user has been clearing the various accounts using the service provider ("Acme Investments") account. The application can then display account information for those accounts, and their respective projected impact on the "Acme Investments" account in the projection page 618.

Figure 7:
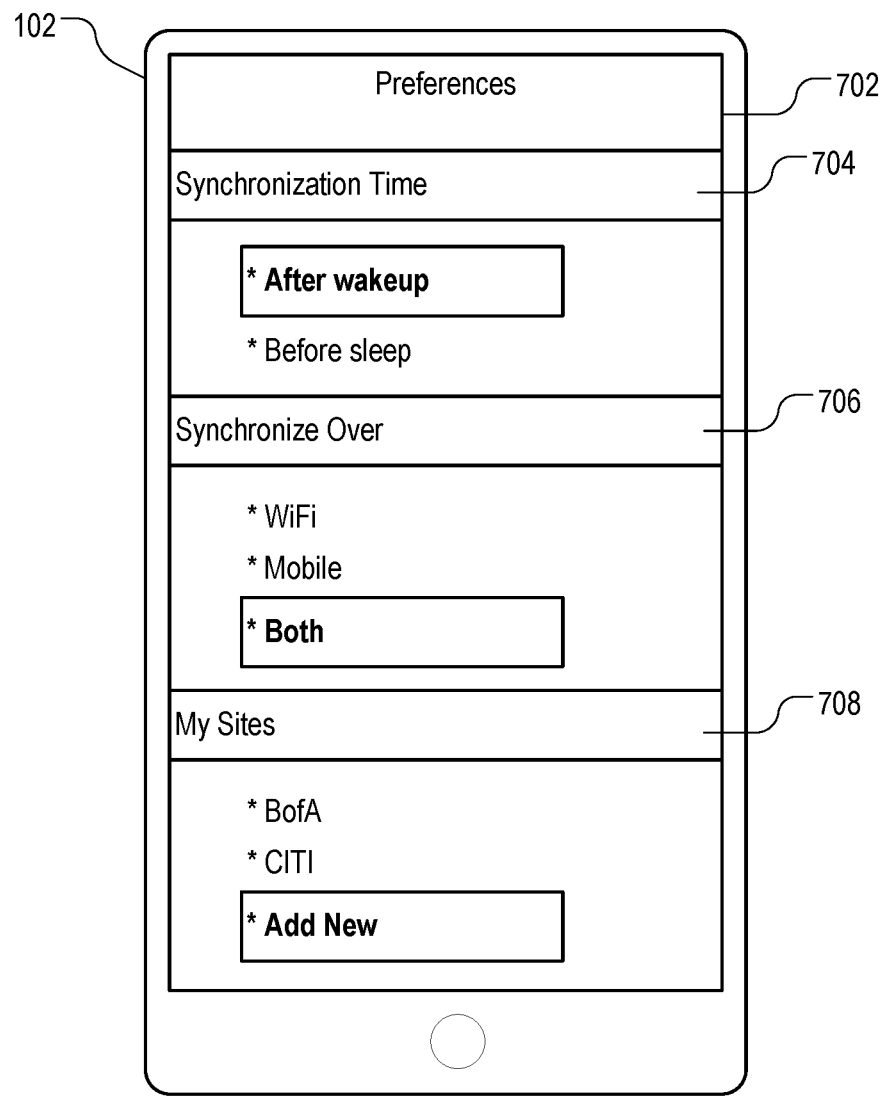
FIG. 7 is an example configuration user interface of an information extraction system.

FIG. 7 is an example configuration user interface 702 of an information extraction system. The configuration user interface 702 can be presented on a mobile device, e.g., the mobile device 102 of FIG. 1. The configuration user interface 702 can accept user input for setting various parameters and preferences of scraping data. The configuration user interface 702 can be an interface for a scraping scheduler, which can be implemented by a data collection library, e.g., the data collection library 204 of FIG. 2.

The configuration user interface 702 includes a synchronization time setting section 704. The synchronization time setting section 704 includes one or more user interface items configured to receive user input for setting one or more time periods for collecting data from target sites, e.g., after wakeup or before sleep. The mobile device can, for example, display a notification after being turned on accordingly, after wakeup or before sleep. The mobile device can then receive a user confirmation to start collecting the data.

The configuration user interface 702 includes a network preference section 706. The network preference section 706 includes one or more user interface items configured to receive user input for setting network conditions for collecting data from target sites. The network conditions can include, for example, whether data collection occurs only over Wi-Fi connections, whether data collection occurs only over mobile data connections, or whether data collection can occur either over Wi-Fi connections or over mobile data connections.

The configuration user interface 702 includes a site preference section 708. The site preference section 708 includes one or more user interface items configured to receive user input for adding a target site, configuring a target site, or deleting a target site. Configuring a target site can include entering site link and credentials for accessing the site.

Figure 8:
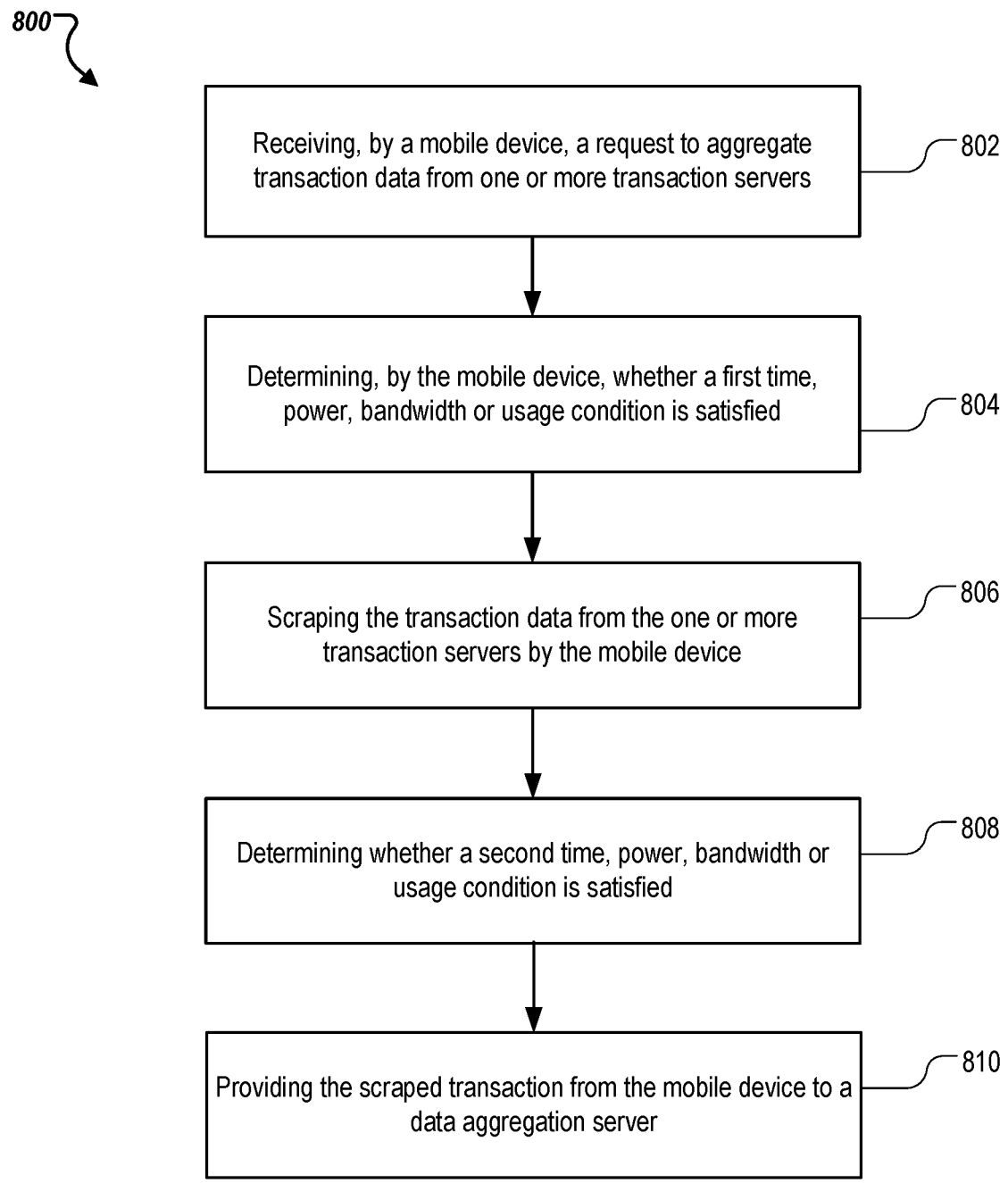
FIG. 8 is a flowcharts illustrating a first example process of information extraction by a mobile device.

FIG. 8 is a flowcharts illustrating a first example process 800 of information extraction by a mobile device. The mobile device can be the mobile device 102 of FIG. 1.

The mobile device receives (802) a request to aggregate transaction data from one or more transaction servers of a target site. The target site can be a Web site or a file repository, e.g., an FTP site. The target site corresponds to a service provider, e.g., a hospital, school, or bank.

The mobile device determines (804) whether a first condition is satisfied. The first condition can include a time, power, bandwidth or usage condition. The first condition can be a user specified condition. The first condition can be a time condition that specifies whether the mobile device can collect data in a particular time period, e.g., whether the mobile device should scrape the data after wakeup or before sleep. The time condition can be a whether a pre-set scraping time, e.g., 1:00 am every day, has been reached. The first condition can be a bandwidth condition specifying that scraping shall occur when a Wi-Fi connection is present.

In response to determining that the first condition is satisfied, the mobile device scrapes (806) the transaction data from the one or more transaction servers by the mobile device, including providing respective user credentials to each transaction server and navigating a respective mobile web site of each transaction server.

The mobile device determines (808) whether a second condition is satisfied. The second condition, like the first condition can include a time, power, bandwidth or usage condition. The second condition can be the same as, or different from, the first condition. For example, the second condition can be a time condition of whether a pre-set data submission time, e.g., 3:00 am every day, has been reached. Each of the first condition and second condition can be based on a user-specified timing mode, an automatic timing mode, or a mixed timing mode.

In response to determining that the second condition is satisfied, the mobile device provides (810) the scraped transaction data from the mobile device to a data aggregation server. The data aggregation server can include one or more computers of the data aggregation server 106 of FIG. 1.

Figure 9:
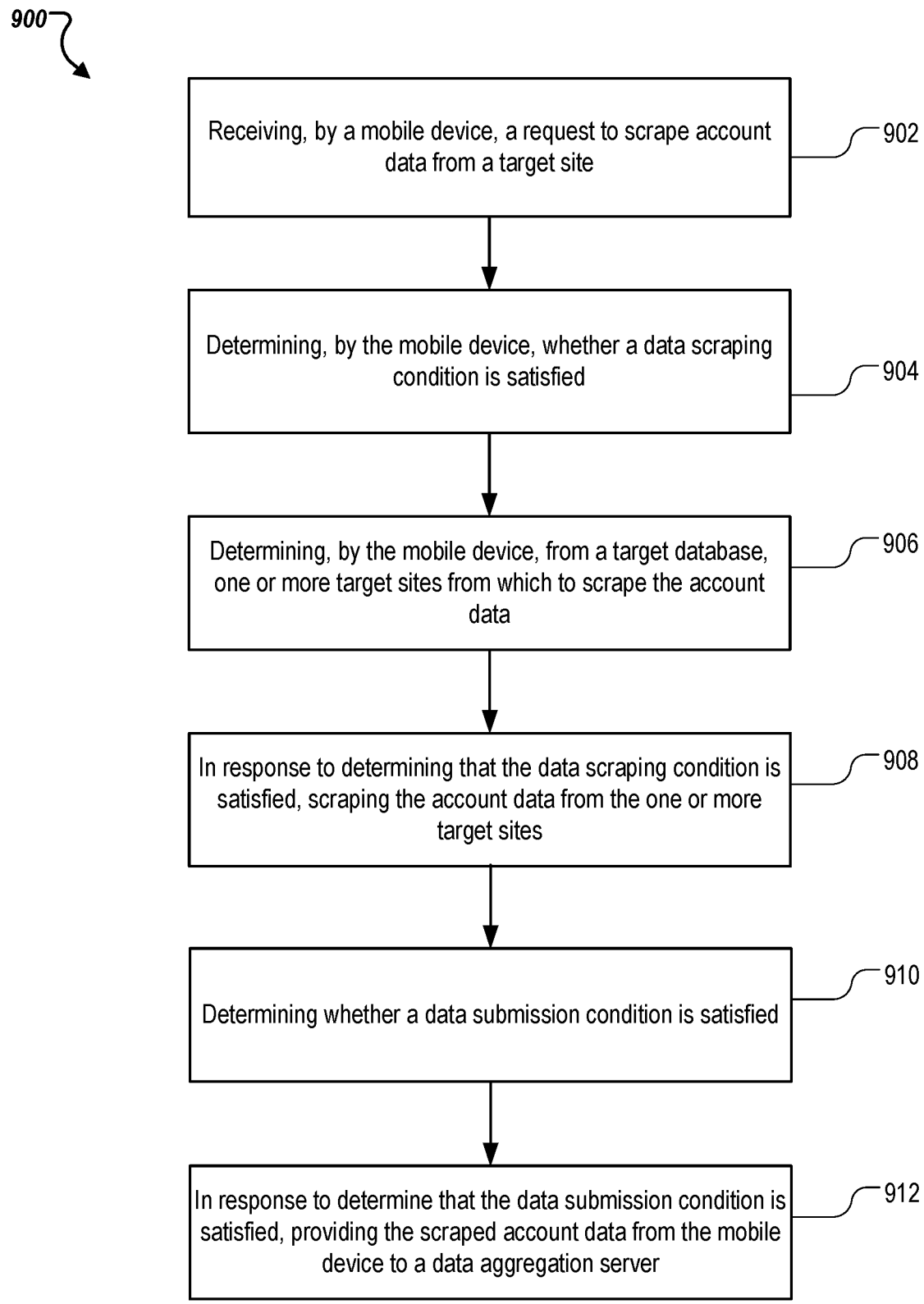
FIG. 9 is a flowcharts illustrating a second example process of information extraction by a mobile device.

FIG. 9 is a flowcharts illustrating a second example process 900 of information extraction by a mobile device. The process 900 can be performed by a mobile device including one or more processors, e.g., the mobile device 102 of FIG. 1.

The mobile device receives (902) a request to scrape account data. The mobile device can receive the request from a scraping scheduler of the mobile device. The scraping scheduler can be part of a scraping library, e.g., the data collection library 204 of FIG. 2. The mobile device can receive the request from a data aggregation server, which can be a computer of the data aggregation server 106 of FIG. 1 that includes one or more processers. The data aggregation server can send the request can according to a schedule specified by a user of the mobile device.

The mobile device determines (904) whether a data scraping condition is satisfied. The data scraping condition can be specified on the mobile device. The data scraping condition includes at least one of a first time condition, a first power condition, a first bandwidth condition, or a first device usage condition. For example, the first time condition can specify whether the scraping should occur after wakeup or before sleep. The first bandwidth condition can specify that the scraping occurs when a Wi-Fi connection is present.

The mobile device determines (906), from a target database, one or more target sites from which to scrape the account data. The target sites can be entered by a user of the mobile device, or provide by a data aggregation program of the data application server.

In response to determining that the data scraping condition is satisfied, the mobile device scrapes (908) the account data from the one or more target sites. Scraping the account data includes providing respective user credentials to each target site and navigating pages, e.g., pages of a respective mobile web site, of each target site. The mobile device the retrieves the account data from the pages.

The mobile device determines (910) whether a data submission condition is satisfied. The data submission condition can be specified on the mobile device. The data submission condition includes at least one of a second power condition, a second bandwidth condition, or a second device usage condition. Each condition, including the data scraping condition and the data submission condition, can be based on a user-specified timing mode, and automatic timing mode, and a mixed timing mode.

In response to determining that the data submission condition is satisfied, the mobile device provides (912) the scraped account data from the mobile device to the data aggregation server. The data aggregation server can aggregate the scraped data, including aggregate the account data scraped by the mobile device and other data scraped by the data aggregation server. The data aggregation server can generate an account report from the aggregated data, and provide the account report to the mobile device, or another user device, for storage, for presentation on a screen or for printout.

EXAMPLE MOBILE DEVICE ARCHITECTURE

Figure 10:
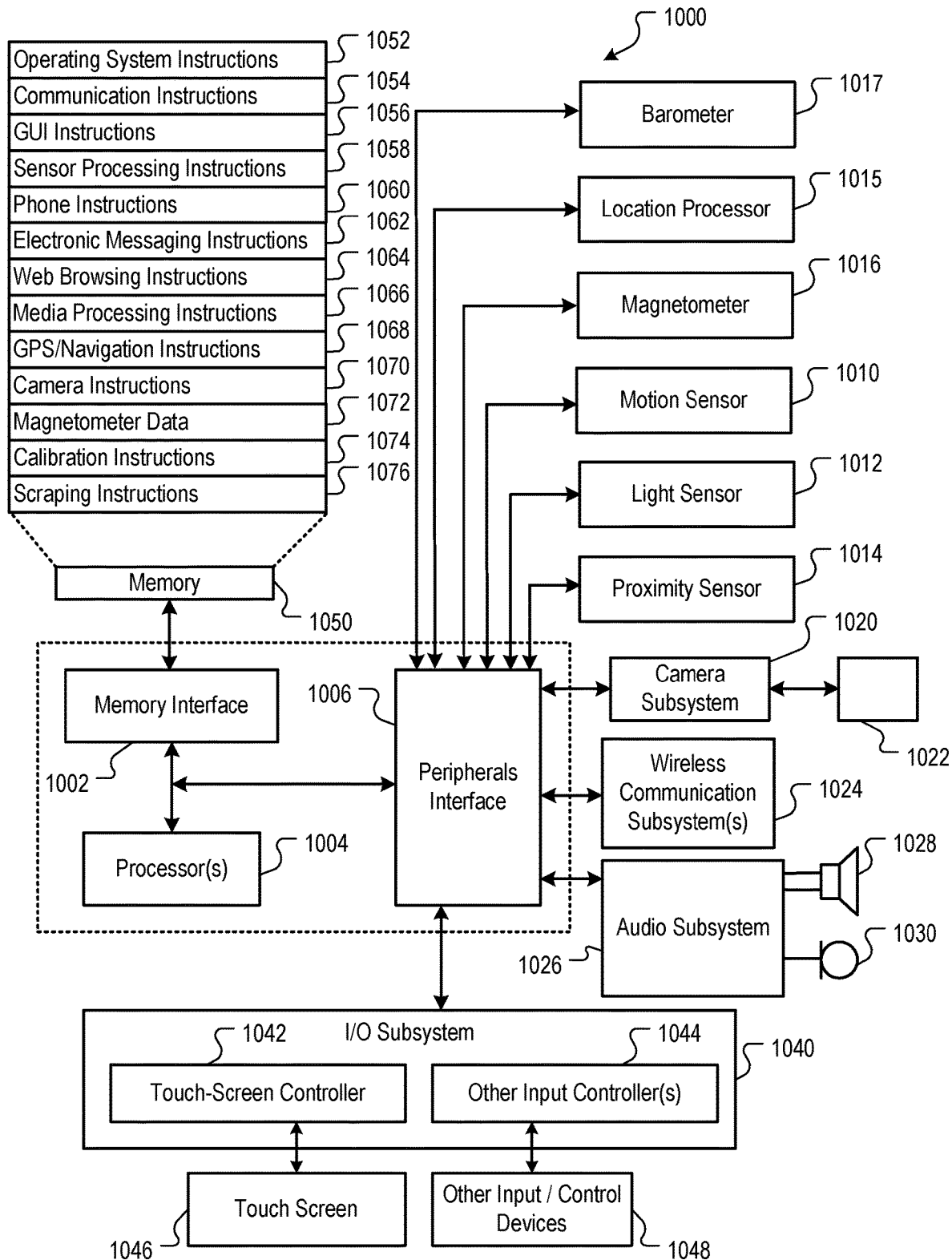
FIG. 10 is a block diagram illustrating an example device architecture of a mobile device implementing the features and operations described in reference to FIGS. 1-9.

FIG. 10 is a block diagram of an example architecture 1000 for a mobile device. A mobile device (e.g., the mobile device 102 of FIG. 1) can include memory interface 1002, one or more data processors, image processors and/or processors 1004, and peripherals interface 1006. Memory interface 1002, one or more processors 1004 and/or peripherals interface 1006 can be separate components or can be integrated in one or more integrated circuits. Processors 1004 can include application processors, baseband processors, and wireless processors. The various components in the mobile device, for example, can be coupled by one or more communication buses or signal lines.

Sensors, devices and subsystems can be coupled to peripherals interface 1006 to facilitate multiple functionalities. For example, motion sensor 1010, light sensor 1012 and proximity sensor 1014 can be coupled to peripherals interface 1006 to facilitate orientation, lighting and proximity functions of the mobile device. Location processor 1015 (e.g., GPS receiver) can be connected to peripherals interface 1006 to provide geopositioning. Electronic magnetometer 1016 (e.g., an integrated circuit chip) can also be connected to peripherals interface 1006 to provide data that can be used to determine the direction of magnetic North. Thus, electronic magnetometer 1016 can be used as an electronic compass. Motion sensor 1010 can include one or more accelerometers configured to determine change of speed and direction of movement of the mobile device. Barometer 1017 can include one or more devices connected to peripherals interface 1006 and configured to measure pressure of atmosphere around the mobile device.

Camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1024, which can include radio frequency receivers and transmitters and/or optical (e.g., infrared) receivers and transmitters. The specific design and implementation of the communication subsystem 1024 can depend on the communication network(s) over which a mobile device is intended to operate. For example, a mobile device can include communication subsystems 1024 designed to operate over a GSM network, a GPRS network, an EDGE network, a Wi-Fi™ or WiMax™ network and a Bluetooth™ network. In particular, the wireless communication subsystems 1024 can include hosting protocols such that the mobile device can be configured as a base station for other wireless devices.

Audio subsystem 1026 can be coupled to a speaker 1028 and a microphone 1030 to facilitate voice-enabled functions, such as voice recognition, voice replication, digital recording, and telephony functions. Audio subsystem 1026 can be configured to receive voice commands from the user.

I/O subsystem 1040 can include touch surface controller 1042 and/or other input controller(s) 1044. Touch surface controller 1042 can be coupled to a touch surface 1046 or pad. Touch surface 1046 and touch surface controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 1046. Touch surface 1046 can include, for example, a touch screen.

Other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of speaker 1028 and/or microphone 1030.

In one implementation, a pressing of the button for a first duration may disengage a lock of the touch surface 1046; and a pressing of the button for a second duration that is longer than the first duration may turn power to the mobile device on or off. The user may be able to customize a functionality of one or more of the buttons. The touch surface 1046 can, for example, also be used to implement virtual or soft buttons and/or a keyboard.

In some implementations, the mobile device 102 can present recorded audio and/or video files, such as MP3, AAC, and MPEG files. In some implementations, the mobile device can include the functionality of an MP3 player. Other input/output and control devices can also be used.

Memory interface 1002 can be coupled to memory 1050. Memory 1050 can include high-speed random access memory and/or non-volatile memory, such as one or more magnetic disk storage devices, one or more optical storage devices, and/or flash memory (e.g., NAND, NOR). Memory 1050 can store operating system 1052, such as Darwin, RTXC, LINUX, UNIX, OS X, WINDOWS, or an embedded operating system such as VxWorks. Operating system 1052 may include instructions for handling basic system services and for performing hardware dependent tasks. In some implementations, operating system 1052 can include a kernel (e.g., UNIX kernel).

Memory 1050 may also store communication instructions 1054 to facilitate communicating with one or more additional devices, one or more computers and/or one or more servers. Memory 1050 may include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GPS/Navigation instructions 1068 to facilitate GPS and navigation-related processes and instructions; camera instructions 1070 to facilitate camera-related processes and functions; magnetometer data 1072 and calibration instructions 1074 to facilitate magnetometer calibration. The memory 1050 may also store other software instructions (not shown), such as security instructions, web video instructions to facilitate web video-related processes and functions, and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 1050. Memory 1050 can store scraping instructions 1076 that, when executed, can cause processor 1004 to perform operations of data scraping, including executing example processes 800 and 900 as described above in reference to FIG. 8 and FIG. 9, respectively.

Each of the above identified instructions and applications can correspond to a set of instructions for performing one or more functions described above. These instructions need not be implemented as separate software programs, procedures or modules. Memory 1050 can include additional instructions or fewer instructions. Furthermore, various functions of the mobile device may be implemented in hardware and/or in software, including in one or more signal processing and/or application specific integrated circuits.

EXAMPLE OPERATING ENVIRONMENT

Figure 11:
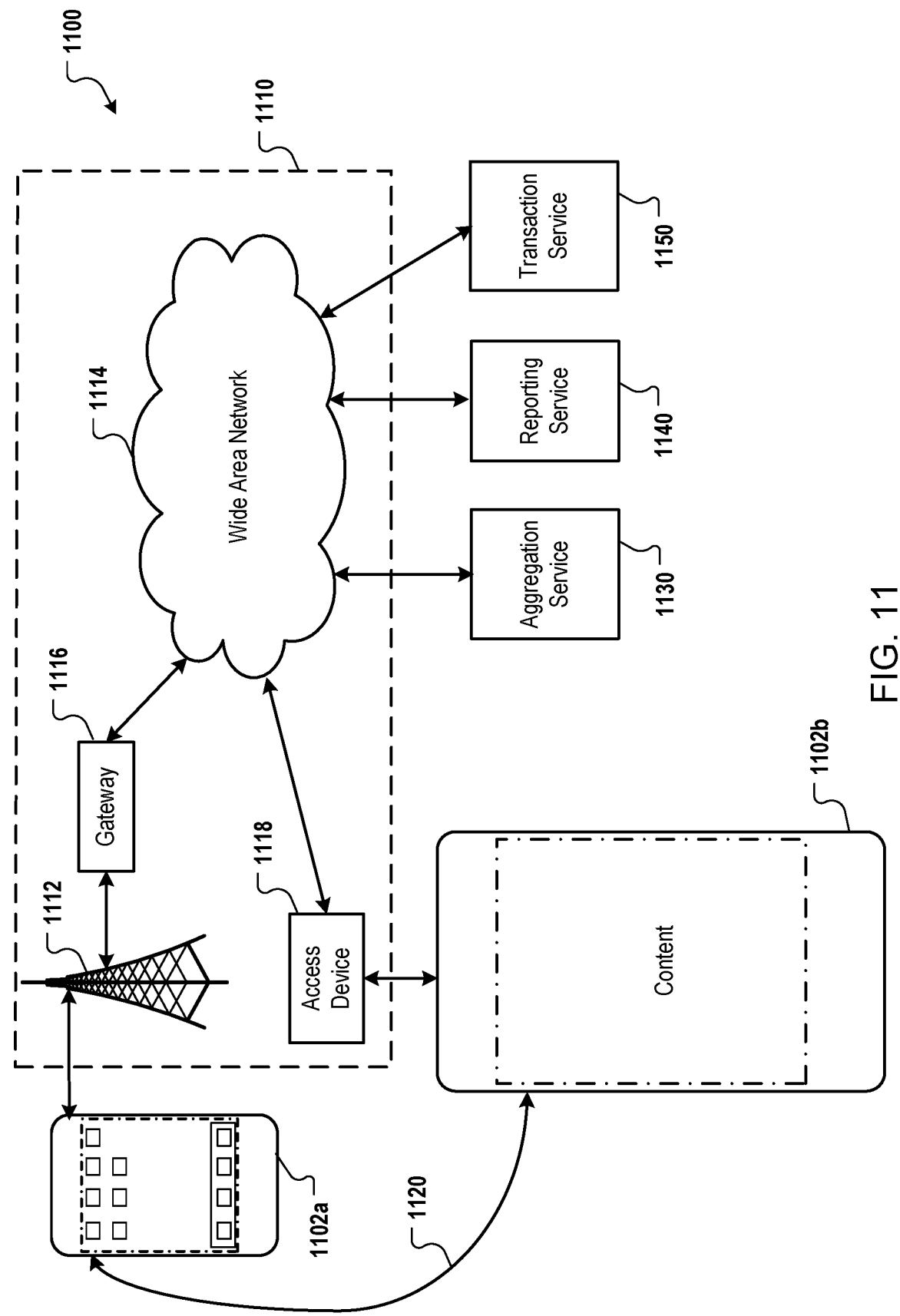
FIG. 11 is a block diagram of an example network operating environment for the mobile devices of FIGS. 1-9.

FIG. 11 is a block diagram of an example network operating environment 1100 for the mobile devices of FIGS. 1-6. Mobile devices 1102a and 1102b can, for example, communicate over one or more wired and/or wireless networks 1110 in data communication. For example, a wireless network 1112, e.g., a cellular network, can communicate with a wide area network (WAN) 1114, such as the Internet, by use of a gateway 1116. Likewise, an access device 1118, such as an 802.11g wireless access point, can provide communication access to the wide area network 1114. Each of mobile devices 1102a and 1102b can be mobile device 102.

In some implementations, both voice and data communications can be established over wireless network 1112 and the access device 1118. For example, mobile device 1102a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1112, gateway 1116, and wide area network 1114 (e.g., using Transmission Control Protocol/Internet Protocol (TCP/IP) or User Datagram Protocol (UDP)). Likewise, in some implementations, the mobile device 1102b can place and receive phone calls, send and receive e-mail messages, and retrieve electronic documents over the access device 1118 and the wide area network 1114. In some implementations, mobile device 1102a or 1102b can be physically connected to the access device 1118 using one or more cables and the access device 1118 can be a personal computer. In this configuration, mobile device 1102a or 1102b can be referred to as a "tethered" device.

Mobile devices 1102a and 1102b can also establish communications by other means. For example, wireless device 1102a can communicate with other wireless devices, e.g., other mobile devices, cell phones, etc., over the wireless network 1112. Likewise, mobile devices 1102a and 1102b can establish peer-to-peer communications 1120, e.g., a personal area network, by use of one or more communication subsystems, such as the Bluetooth™ communication devices. Other communication protocols and topologies can also be implemented.

The mobile device 1102*a* or 1102*b* can, for example, communicate with one or more services 1130, 1140, and 1150 over the one or more wired and/or wireless networks. For example, one or more data aggregation services 1130 can provide aggregated service provider data to mobile devices 1102*a* and 1102*b*. Reporting service 1140 can provide aggregated service provider data to data analysis customers, e.g., research institutes. Transaction service 1150 can provide transaction data for aggregation.

Mobile device 1102*a* or 1102*b* can also access other data and content over the one or more wired and/or wireless networks. For example, content publishers, such as news sites, Really Simple Syndication (RSS) feeds, web sites, blogs, social networking sites, developer networks, etc., can be accessed by mobile device 1102*a* or 1102*b*. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

What is claimed is:

1. A method comprising:
   receiving, by a mobile client device of a user and from a data aggregation server, a request to scrape account data associated with the user at one or more target sites corresponding to one or more service providers;
   determining, by the mobile client device of the user based on a target database, a number of target sites from which to scrape the account data associated with the user of the mobile client device;
   determining, by the mobile client device and at a first time, that an amount of time for scraping the number of target sites exceeds a pre-specified time;
   in response to determining that the amount of time for scraping the number of target sites exceeds the pre-specified time, tracking, by the mobile client device, usage of the mobile client device;
   determining, by the mobile client device and based on the usage, a second time for scraping the number of target sites;
   in response to determining the second time for scraping the number of target sites, scraping, by the mobile client device and at the second time, the account data associated with the user of the mobile client device from the target sites, including providing respective user credentials to each target site, navigating pages of each target site, and retrieving the account data from the pages;
   determining, by the mobile client device, whether a data submission condition is satisfied; and
   in response to determining that the data submission condition is satisfied, providing the scraped account data associated with the user of the mobile client device from the mobile client device of the user to the data aggregation server.

2. The method of claim 1, wherein the request is obtained by a scraping scheduler of the mobile client device of the user.

3. The method of claim 1, wherein the request is sent from the data aggregation server according to a schedule specified by the user of the mobile client device.

4. The method of claim 1, wherein:
   the method further comprises determining, by the mobile client device of the user, whether a data scraping condition is satisfied;
   the data scraping condition is specified on the mobile client device of the user and includes at least one of a first time condition, a first power condition, a first bandwidth condition, or a first device usage condition, and
   the data submission condition is specified on the mobile client device of the user and includes at least one of a second time condition, a second power condition, a second bandwidth condition, or a second device usage condition.

5. The method of claim 1, wherein:
   the method further comprises determining, by the mobile client device of the user, whether a data scraping condition is satisfied; and
   the data scraping condition specifies whether the scraping should occur after wakeup or before sleep.

6. The method of claim 1, wherein:
   the method further comprises determining, by the mobile client device of the user, whether a data scraping condition is satisfied; and
   the data scraping condition specifies that the scraping shall occur when a Wi-Fi connection is present.

7. The method of claim 1, wherein each condition is based on a user-specified timing mode, and automatic timing mode, and a mixed timing mode.

8. A non-transitory computer-readable medium storing instructions that, when executed by one or more processors of a mobile client device, cause the one or more processors to perform operations comprising:
   receiving, by the mobile client device of a user and from a data aggregation server, a request to scrape account data associated with the user at one or more target sites corresponding to one or more service providers;
   determining, by the mobile client device of the user based on a target database, a number of target sites from which to scrape the account data associated with the user of the mobile client device;
   determining, by the mobile client device and at a first time, that an amount of time for scraping the number of target sites exceeds a pre-specified time;
   in response to determining that the amount of time for scraping the number of target sites exceeds the pre-specified time, tracking, by the mobile client device, usage of the mobile device;
   determining, by the mobile client device and based on the usage, a second time for scraping the number of target sites;
   in response to determining the second time for scraping the number of target sites, scraping, by the mobile client device and at the second time, the account data associated with the user of the mobile client device from the one or more target sites, including providing respective user credentials to each target site, navigating pages of each target site, and retrieving the account data from the pages;
   determining, by the mobile client device whether a data submission condition is satisfied; and
   in response to determining that the data submission condition is satisfied, providing the scraped account data associated with the user of the mobile client device from the mobile client device of the user to the data aggregation server.

9. The non-transitory computer-readable medium of claim 8, wherein the request is obtained by a scraping scheduler of the mobile client device of the user.

10. The non-transitory computer-readable medium of claim 8, wherein the request is sent from the data aggregation server according to a schedule specified by the user of the mobile client device.

11. The non-transitory computer-readable medium of claim 8, wherein:
the operations further comprise determining, by the mobile client device of the user, whether a data scraping condition is satisfied;
the data scraping condition is specified on the mobile client device of the user and includes at least one of a first time condition, a first power condition, a first bandwidth condition, or a first device usage condition, and
the data submission condition is specified on the mobile client device of the user and includes at least one of a second time condition, a second power condition, a second bandwidth condition, or a second device usage condition.

12. The non-transitory computer-readable medium of claim 8, wherein:
the operations further comprise determining, by mobile client device of the user, whether a data scraping condition is satisfied; and
the data scraping condition specifies whether the scraping should occur after wakeup or before sleep.

13. The non-transitory computer-readable medium of claim 8, wherein:
the operations further comprise determining, by the mobile client device of the user, whether a data scraping condition is satisfied; and
the data scraping condition specifies that the scraping shall occur when a Wi-Fi connection is present.

* * * * *